(12) United States Patent
Willer et al.

(10) Patent No.: US 11,426,810 B2
(45) Date of Patent: Aug. 30, 2022

(54) ASPHALT SAW BLADE

(71) Applicant: Weldco Fabrication and Design, LLC, Vernal, UT (US)

(72) Inventors: Rhadd Vernon Willer, Grand Junction, CO (US); Jacob Robert Willer, Vernal, UT (US)

(73) Assignee: Weldco Fabrication and Design, LLC, Vernal, UT (US)

( * ) Notice: Subject to any disclaimer, the term of this patent is extended or adjusted under 35 U.S.C. 154(b) by 151 days.

(21) Appl. No.: 16/983,210

(22) Filed: Aug. 3, 2020

(65) Prior Publication Data
US 2022/0032383 A1    Feb. 3, 2022

(51) Int. Cl.
*B23D 61/04* (2006.01)
*B23D 61/02* (2006.01)
*B28D 1/12* (2006.01)
*B23D 61/12* (2006.01)

(52) U.S. Cl.
CPC .......... *B23D 61/04* (2013.01); *B23D 61/021* (2013.01); *B23D 61/023* (2013.01); *B23D 61/026* (2013.01); *B23D 61/122* (2013.01); *B23D 61/123* (2013.01); *B28D 1/121* (2013.01)

(58) Field of Classification Search
CPC .... B23D 61/04; B23D 61/021; B23D 61/023; B23D 61/026; B23D 61/122; B23D 61/123
See application file for complete search history.

(56) References Cited

U.S. PATENT DOCUMENTS

| | | | | |
|---|---|---|---|---|
| 3,498,283 A | * | 3/1970 | Cook | B24D 5/06 451/541 |
| 3,675,526 A | * | 7/1972 | Bush | B27B 9/02 83/854 |
| 4,102,230 A | * | 7/1978 | Magnusson | B23D 61/026 83/835 |
| 4,106,382 A | * | 8/1978 | Salje | B23D 61/026 83/835 |
| 4,187,754 A | * | 2/1980 | Beaty | B23D 61/026 83/835 |
| 4,989,489 A | * | 2/1991 | Pinney | B23D 61/06 83/848 |
| 5,211,212 A | * | 5/1993 | Carlson | A01G 23/091 144/34.1 |
| 5,647,264 A | * | 7/1997 | Proulx | B23D 61/06 83/855 |
| 5,829,423 A | * | 11/1998 | Benz | B23D 61/06 125/13.01 |
| 6,089,480 A | * | 7/2000 | Rawlings | B02C 18/144 241/73 |
| 6,526,959 B1 | * | 3/2003 | Lee | B23D 61/026 125/15 |
| 6,536,322 B1 | * | 3/2003 | Butler | B23D 61/06 83/840 |

(Continued)

*Primary Examiner* — Sean M Michalski
(74) *Attorney, Agent, or Firm* — Kirton Mcconkie; Brian Tucker

(57) ABSTRACT

A unique design is provided that increases the strength and extends the life of an asphalt saw blade. The asphalt saw blade may include a main body, outer plates and cutters that are secured to the main body and outer plates via a notched interface. The cutters can include cutting elements and a plate that reinforces the cutting elements while also shielding the cutter's main body from wear.

20 Claims, 7 Drawing Sheets

(56) References Cited

U.S. PATENT DOCUMENTS

| | | | | |
|---|---|---|---|---|
| 7,128,066 B2* | 10/2006 | Lee | ............... | B28D 1/121 |
| | | | | 125/22 |
| 7,634,897 B2* | 12/2009 | MacLennan | ......... | B23D 61/065 |
| | | | | 56/13.6 |
| 8,540,033 B2* | 9/2013 | Stanley | ............... | A01G 23/093 |
| | | | | 172/548 |
| 9,487,933 B2* | 11/2016 | Clift | ............... | E02F 9/2866 |
| 9,578,816 B2* | 2/2017 | Green | ............... | A01G 23/067 |
| D821,455 S * | 6/2018 | Stanley | ............... | D15/28 |
| 10,051,798 B2* | 8/2018 | Leonardi | ............... | A01G 23/067 |
| 10,537,072 B2* | 1/2020 | Leonardi | ............... | A01G 23/067 |
| 2004/0216580 A1* | 11/2004 | Taillon | ............... | B23D 61/026 |
| | | | | 83/835 |
| 2005/0249560 A1* | 11/2005 | Lee | ............... | B23D 61/04 |
| | | | | 407/118 |
| 2008/0107489 A1* | 5/2008 | Nesse | ............... | B28D 1/121 |
| | | | | 83/13 |
| 2014/0013916 A1* | 1/2014 | Athad | ............... | B26D 3/12 |
| | | | | 83/676 |
| 2015/0020418 A1* | 1/2015 | Clift | ............... | B28D 1/045 |
| | | | | 76/112 |
| 2019/0001424 A1* | 1/2019 | Baratta | ............... | B23D 61/026 |
| 2019/0030754 A1* | 1/2019 | Baratta | ............... | B28D 1/122 |
| 2019/0344367 A1* | 11/2019 | Mac Lennan | ............ | B27B 33/02 |
| 2021/0237180 A1* | 8/2021 | Ishikura | ............... | B23P 15/28 |
| 2021/0245275 A1* | 8/2021 | Baratta | ............... | B23D 59/02 |

* cited by examiner

ASPHALT SAW BLADE

CROSS-REFERENCE TO RELATED APPLICATIONS

N/A

BACKGROUND

It is oftentimes necessary to cut asphalt such as to repair potholes or other road damage, to install utilities, to run fiber optic cables, etc. Because asphalt is softer than other paving materials such as concrete, a specialized saw blade is typically used. Such "asphalt saw blades" typically use a strong metal to bond small diamonds to the saw blade, or more particularly, along the sides and radial edge of teeth that extend around the circumference of the saw blade's main body.

As the saw blade passes through asphalt, the diamonds grind away the asphalt. The strong metal that bonds the diamonds to the saw blade allows the diamonds to chip rather than breaking off. This ensures that a fresh cutting edge will exist on the diamonds for a prolonged period. Eventually, the diamonds will wear completely down or break off at which point the asphalt saw blade will need to be replaced.

BRIEF SUMMARY

The present invention extends to asphalt saw blades. More particularly, embodiments of the present invention encompass a unique design of an asphalt saw blade that can increase the strength and extend the life of the asphalt saw blade. An asphalt saw blade may include a main body, outer plates and cutters that are secured to the main body and outer plates via a notched interface. The cutters can include cutting elements and a plate that reinforces the cutting elements while also shielding the cutter's main body from wear.

In a first example embodiment, the present invention may be implemented as an asphalt saw blade that includes a main body, outer plates and cutters. The main body may have a plurality of teeth. The outer plates may be coupled to opposing sides of the main body and may have teeth that align with the teeth of the main body. The cutters may be coupled to the teeth of the main body and to the teeth of the outer plates via a notched interface.

In the first example embodiment, each cutter may comprise a cutter main body having a front portion and a rear portion. The notched interface may comprise a notch formed in each tooth of the main body and the rear portion of the cutter main body that is positioned within the notch.

In the first example embodiment, the notched interface may also comprise a notch formed in each tooth of the outer plates. The notch formed in each tooth of the outer plates may be configured to create an exposed area of the main body around the notch formed in the corresponding tooth of the main body. The exposed area may have a C shape. The rear portion of the cutter main body may include beveled edges.

In the first example embodiment, each cutter may include a plate that is coupled to a front surface of the front portion of the cutter main body. Each cutter may include one or more cutting elements that are coupled to the front surface of the front portion of the cutter main body. The plate may include a notch within which the one or more cutting elements are positioned.

In a second example embodiment, the present invention may be implemented as an asphalt saw blade that includes a main body having a plurality of teeth and a plurality of cutters. Each cutter may be coupled to a particular tooth of the plurality of teeth on the main body. Each cutter may comprise a cutter main body, a plate secured to a front surface of the cutter main body and one or more cutting elements.

In the second example embodiment, the asphalt saw blade may include outer plates that are coupled to opposing sides of the main body. The outer plates may have teeth that align with the teeth of the main body. The main body and the outer plates may include notches for receiving a rear portion of the cutter main body. The notches of the outer plates may be configured to create an exposed area of the main body that extends around the notches of the main body.

In the second example embodiment, the one or more cutting elements may comprise two cutting elements. The plate may include a notch within which the two cutting elements are positioned.

In a third example embodiment, the present invention may be implemented as an asphalt saw blade that includes a main body, outer plates and cutters. The main body has an inner body and a plurality of teeth that extend from a radial edge of the inner body. The outer plates have an inner body and a plurality of teeth that extend from a radial edge of the inner body of the outer plates. The outer plates are coupled to opposing sides of the main body. The teeth of the outer plates align with the teeth of the main body. The cutters are coupled to the teeth of the main body.

In the third example embodiment, each of the teeth of the main body may have a notch, and each of the teeth of the outer plates may have a notch that creates an exposed area of the main body around the notch of the corresponding tooth of the main body. Each cutter may include a cutter main body having a front portion and a rear portion. Each cutter may be coupled to a particular tooth of the main body by positioning the rear portion of the cutter main body within the notch of the particular tooth. Each cutter may include a cutter main body having a front surface, a plate secured to the front surface and one or more cutting elements secured to the front surface. The cutters may also be coupled to the teeth of the outer plates.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1A:
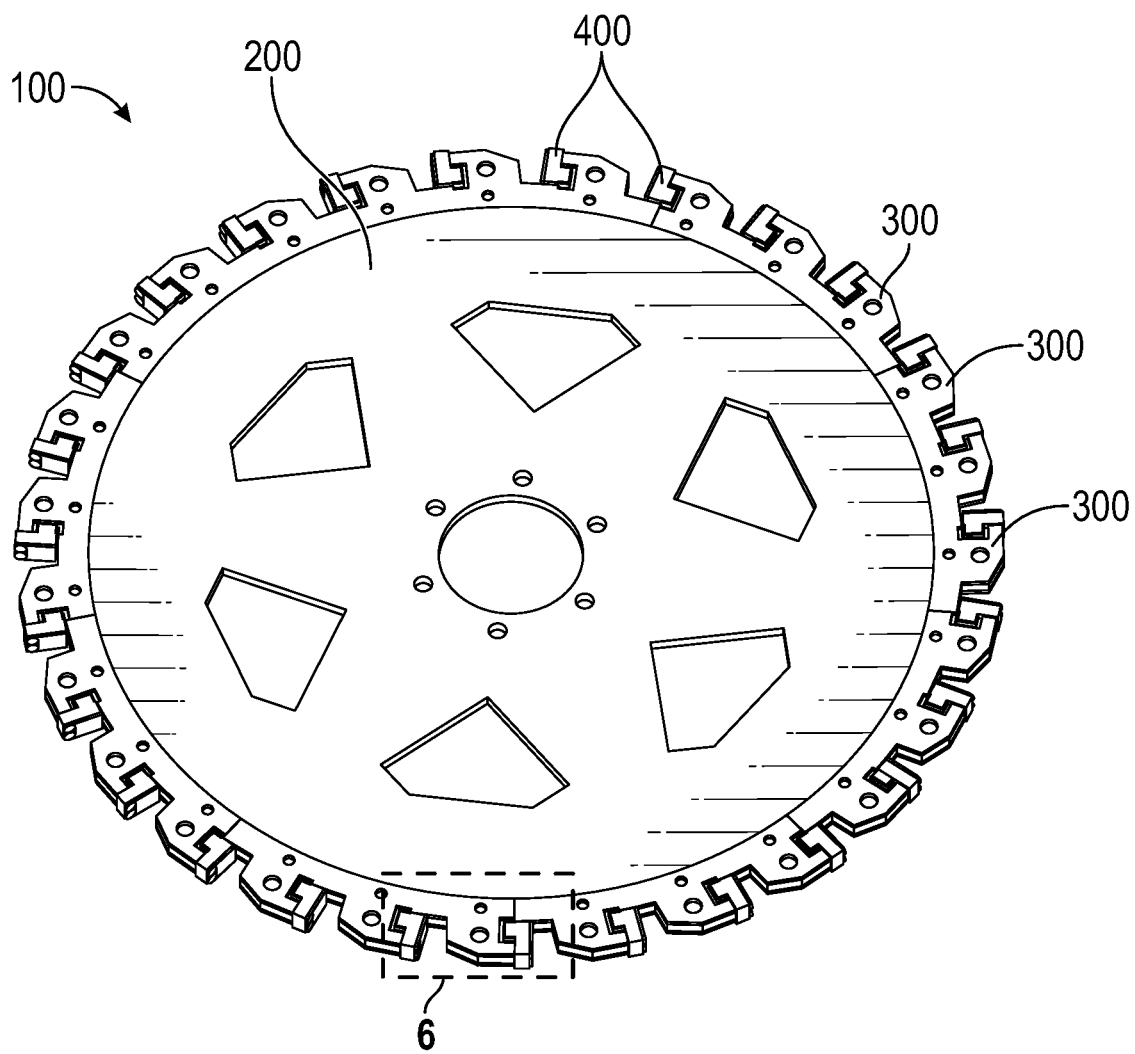
FIGS. 1A and 1B provide a perspective side view and a side view respectively of an asphalt saw blade that is configured in accordance with embodiments of the present invention.
Figure 1B:
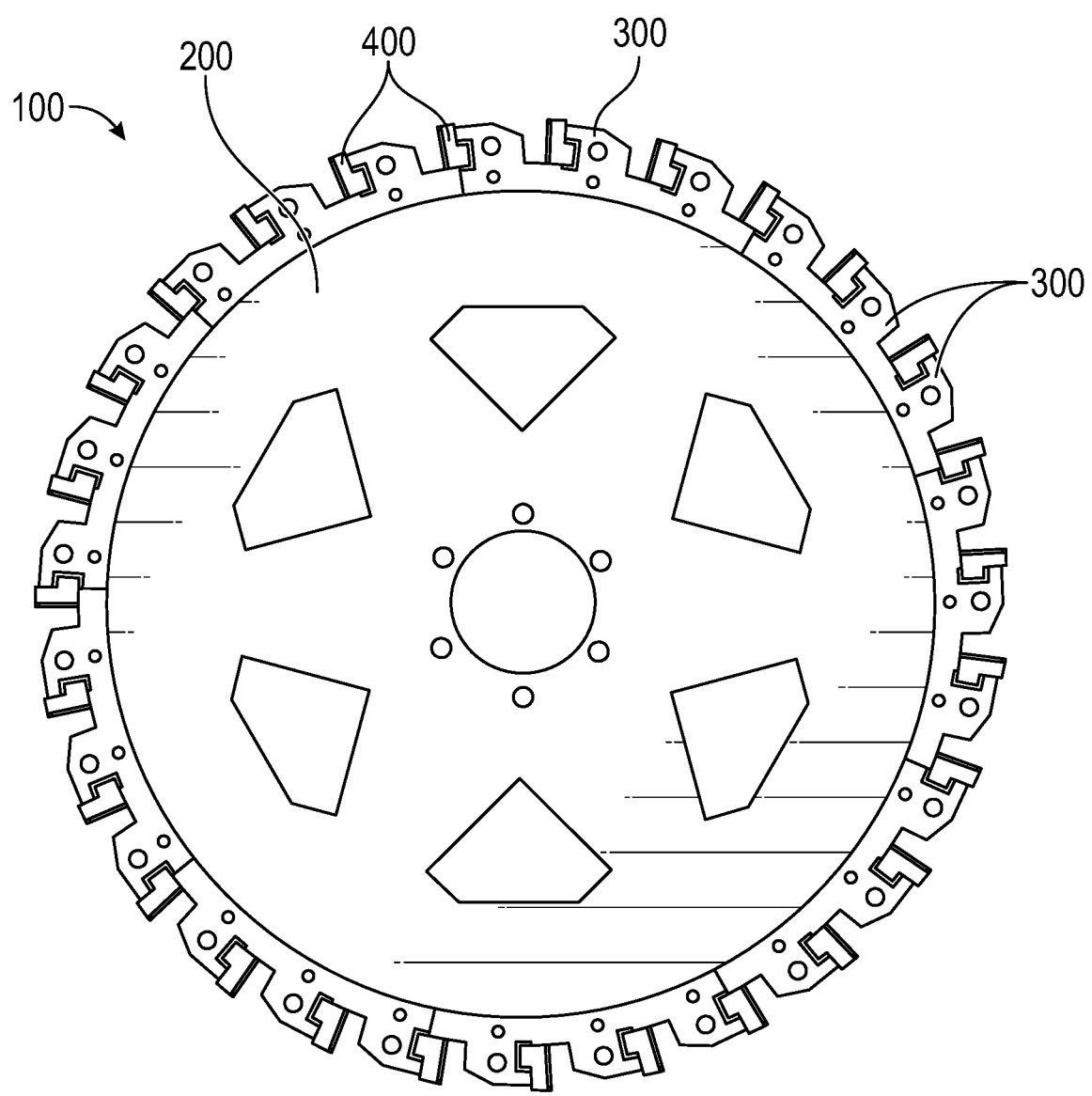
Figure 2A:
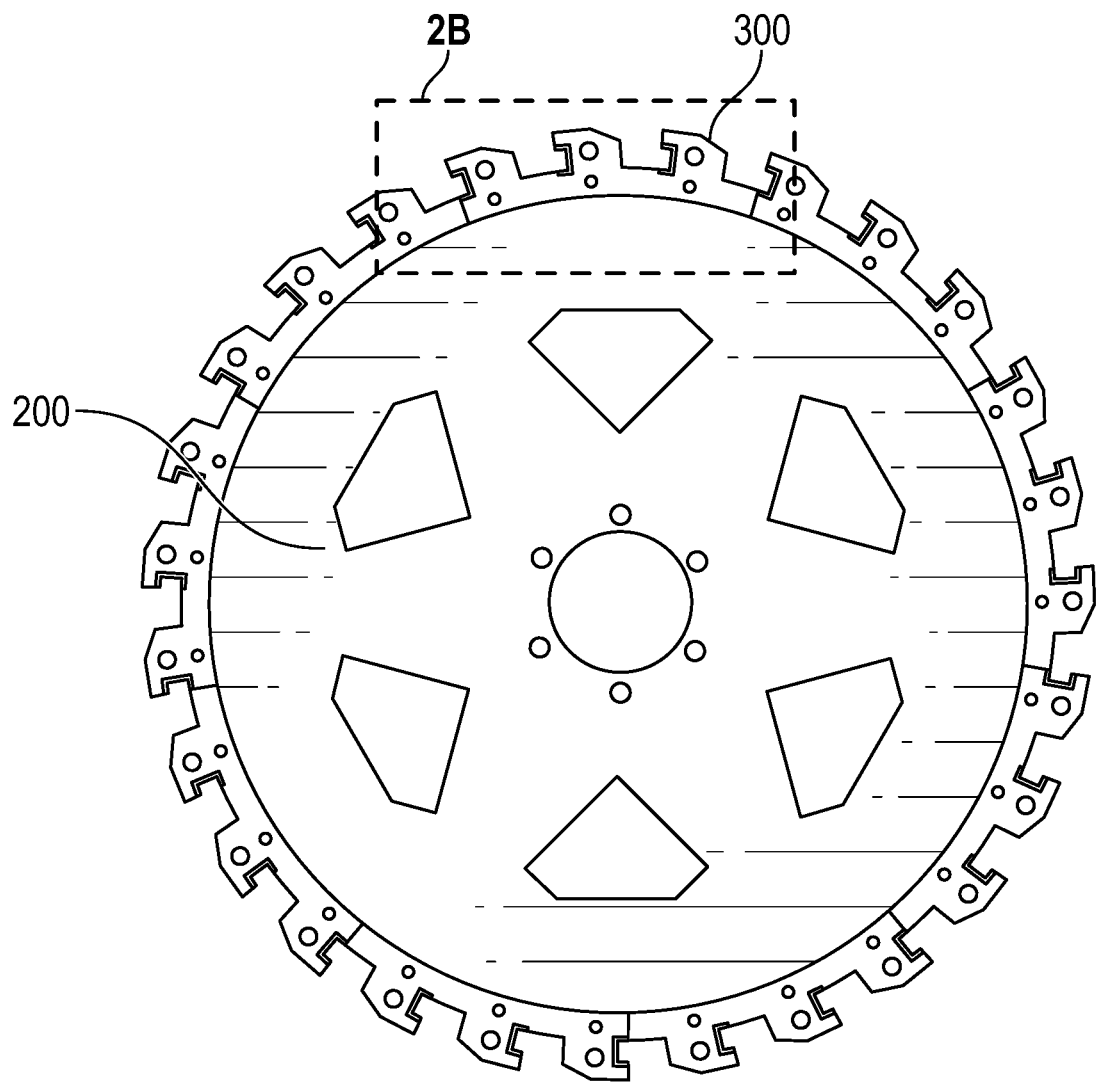
FIG. 2A provides a side view of the asphalt saw blade of FIGS. 1A and 1B without the cutters.
Figure 2B:
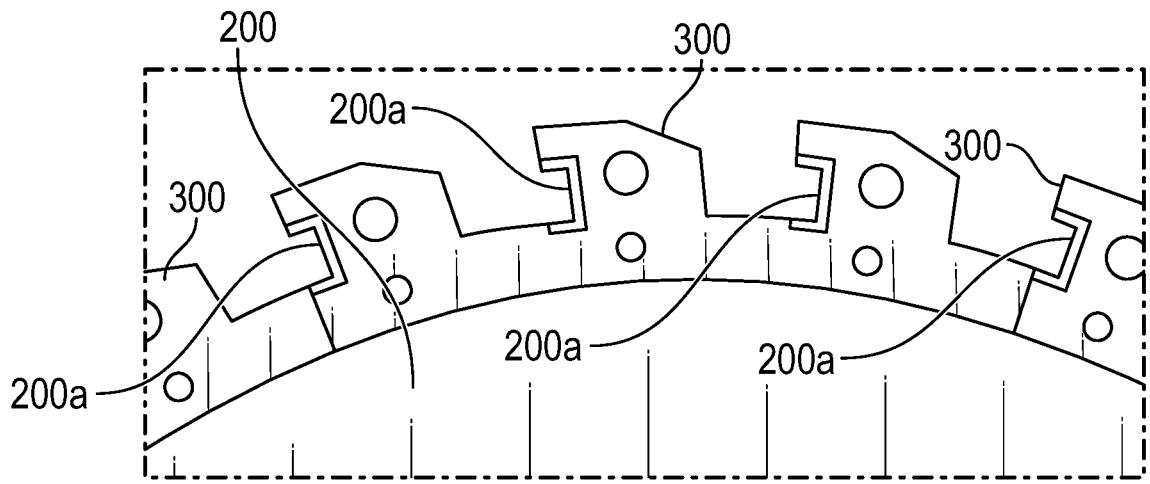
FIG. 2B provides a detailed view of a portion of FIG. 2A showing various teeth of the asphalt saw blade.
Figure 3:
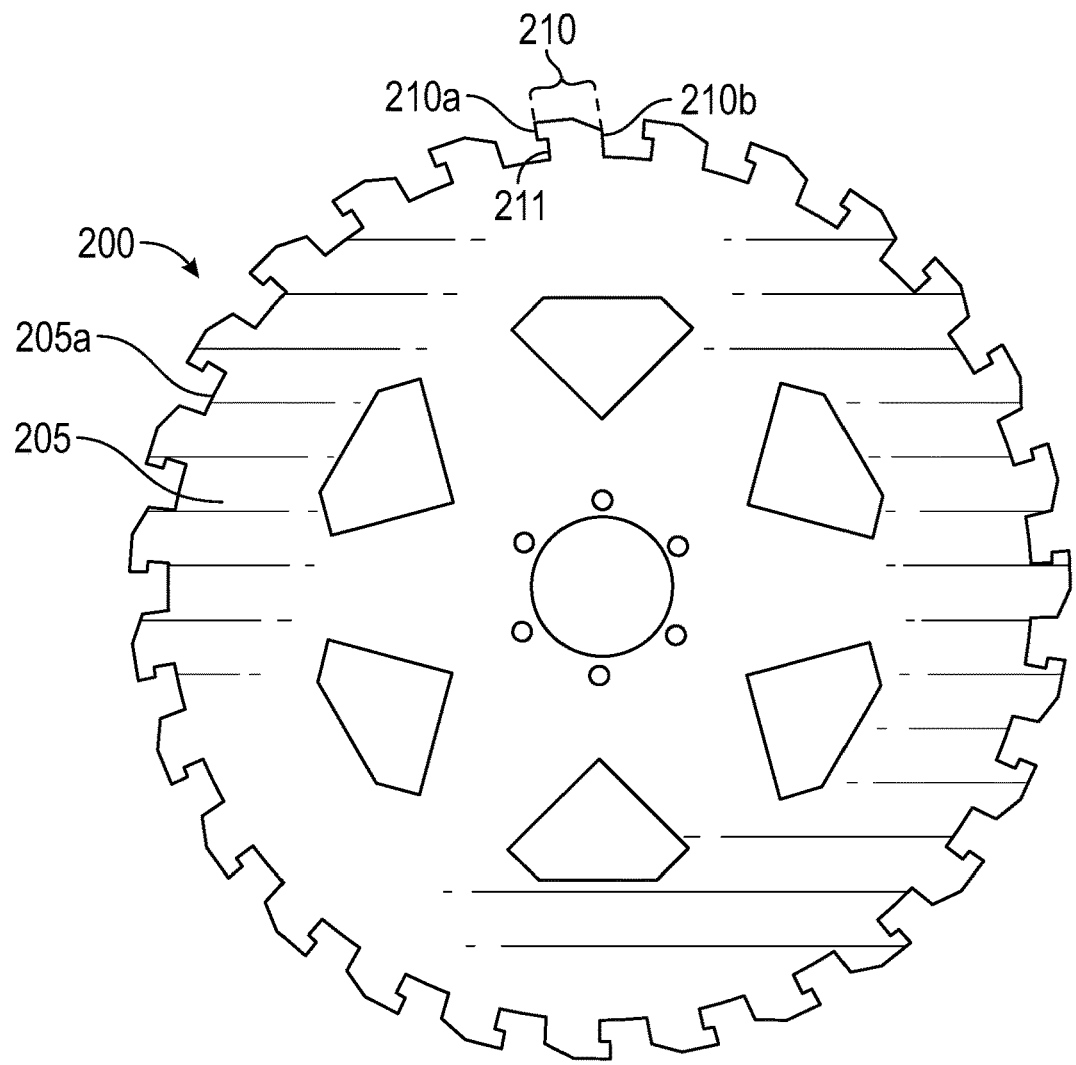
FIG. 3 provides an isolated side view of the main body of the asphalt saw blade of FIGS. 1A and 1B.
Figure 4:
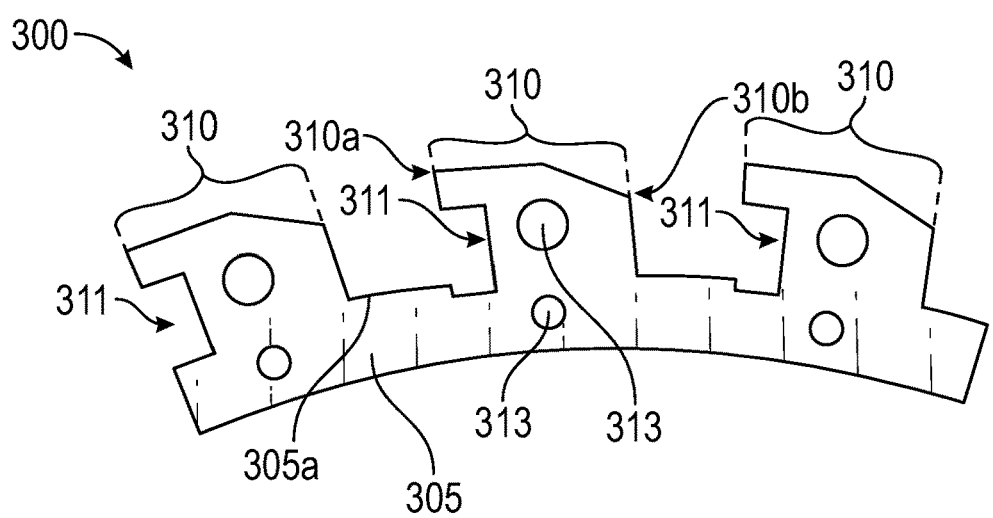
FIG. 4 provides an isolated side view of an outer plate of the asphalt saw blade of FIGS. 1A and 1B.
Figure 5A:
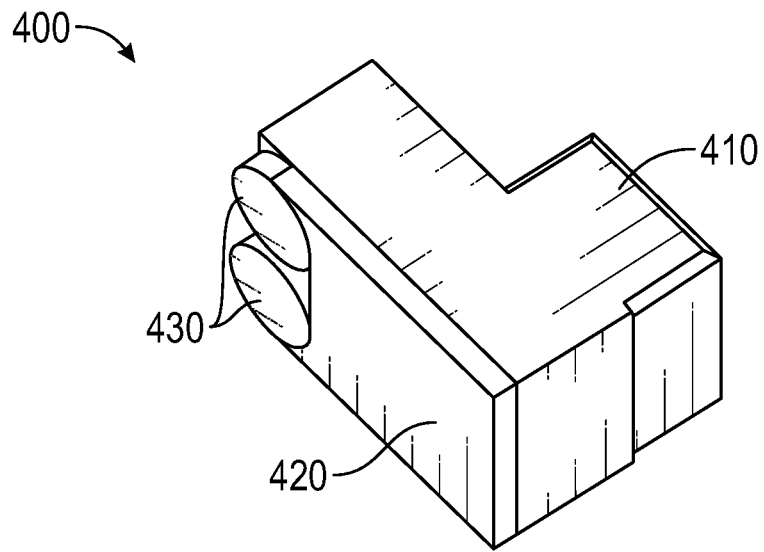
FIG. 5A provides an isolated perspective side view of a cutter of the asphalt saw blade of FIGS. 1A and 1B.
Figure 5B:
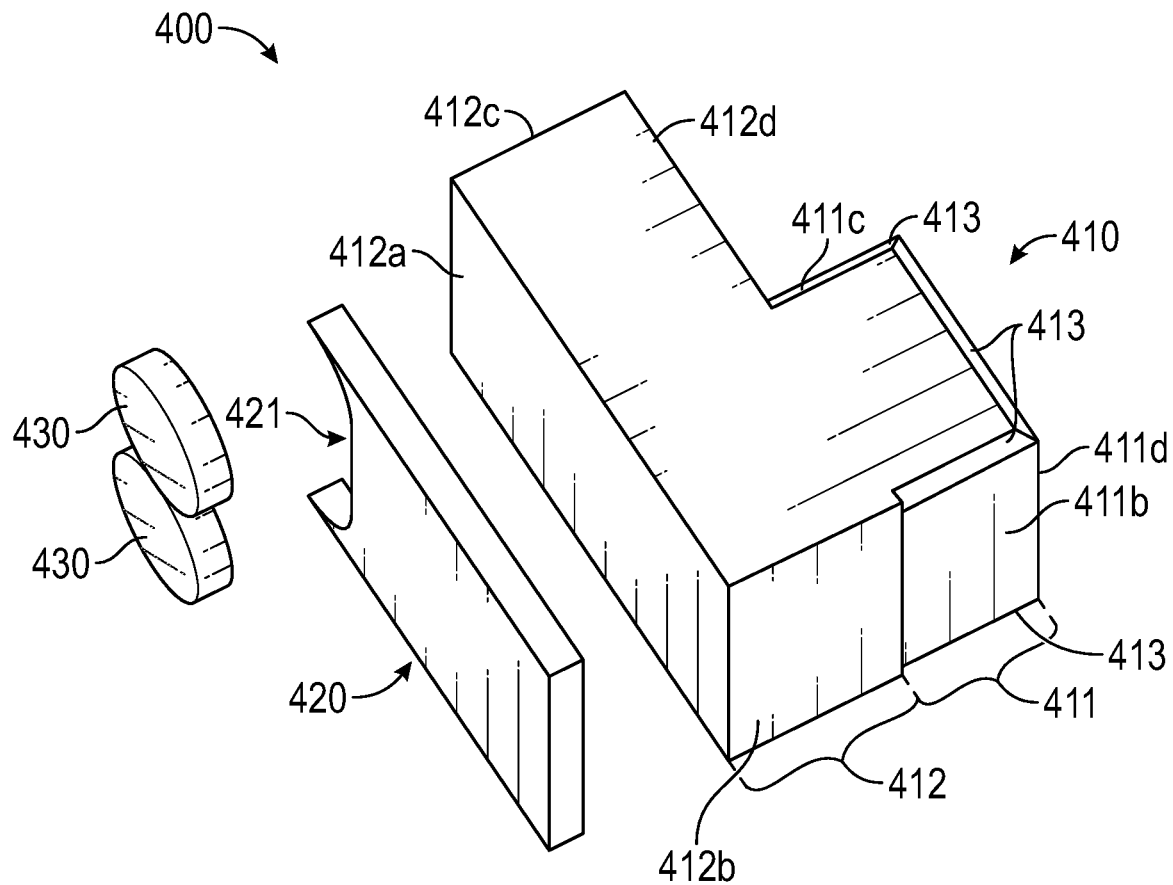
FIG. 5B provides an exploded view of the cutter of FIG. 5A.

FIGS. 1A and 1B provide a perspective side view and a side view respectively of an asphalt saw blade 100 that is configured in accordance with embodiments of the present invention. Asphalt saw blade 100 includes a main body 200, a number of outer plates 300 and a number of cutters 400. FIGS. 3, 4 and 5A illustrate main body 200, an outer plate 300 and a cutter 400 in isolation, while FIGS. 2A and 2B illustrate main body 200 and outer plates 300 without cutters 400.

With primary reference to FIG. 3, main body 200 has a circular shaped inner body 205 and includes a number of teeth 210 that extend from a radial edge 205a of inner body 205. Each tooth 210 includes a leading edge 210a and a trailing edge 210b. In this context, the term "leading" represents that leading edge 210a is the edge that is the leading (or front) edge when asphalt saw blade 100 is used. For example, with reference to the orientation shown in FIG. 1B, asphalt saw blade 100 would rotate in a counterclockwise direction. Each of teeth 210 includes a notch 211 formed in leading edge 210a. Notch 211 is positioned adjacent to radial edge 205a. In other words, radial edge 205a defines the axially inward edge of notch 211.

Although FIG. 3 shows that radial edge 205a forms a circle, in some embodiments, each portion of radial edge 205a need not extend along the same circle. For example, in some embodiments, one portion of radial edge 205a may be axially offset relative to another portion of radial edge 205a. Similarly, in some embodiments, a portion of radial edge 205a may form a straight line (as opposed to a curved line that matches the circumference of a circle), may be angled relative to a circumference of a circle or may form some other shape that does not match a generally circular shape. In short, embodiments of the present invention should not be limited to any particular configuration of radial edge 205a, and therefore, radial edge 205a may be construed as the portion of inner body 205 that extends between adjacent teeth 210.

Outer plate 400, which may be formed of steel alloy, may have a shape that generally matches the shape of a section of the outer portion of main body 200. A pair of outer plates 400 may be positioned on either side of a section of main body 200 to provide reinforcement to the section (among other things as described below). With primary reference to FIG. 4, each outer plate 400 includes an inner body 305 forming a radial edge 305a that aligns with radial edge 205a and a number of teeth 310 that align with teeth 210. More particularly, each tooth 310 includes a leading edge 310a and a trailing edge 310b that match the shape and size of leading edge 210a and trailing edge 210b respectively of tooth 210. As best seen in FIG. 2B, each tooth 310 also includes a notch 311 that generally matches, but is larger than, the corresponding notch 211 such that an exposed region 200a is created on both sides of main body 200 when outer plates 400 are coupled to main body 200.

In the depicted embodiment, exposed region 200a has a general C-shape, or in other words, notch 311 exposes the portion of main body 200 that surrounds the generally C-shaped notch 211. Therefore, in the depicted embodiment, exposed region 200a encompasses a portion of main body 200 that extends axially outwardly from an axially inward facing edge of notch 211, a portion of main body that extends rearwardly from a frontward facing edge of notch 211 and a portion of main body that extends axially inwardly from radial edge 205a. Although notch 311 has the same shape as notch 211 in the depicted embodiments, in other embodiments, notch 211 and notch 311 can have different shapes.

In the depicted embodiments, each outer plate 300 includes three teeth 310. However, an outer plate 300 could include any other number of teeth 310 and each outer plate 300 need not include the same number of teeth 310. Also, in some embodiments, a single outer plate 300 could be used on each side of main body 200 (i.e., each outer plate 300 could have the same number of teeth as main body 200). However, to facilitate the manufacturing process, such as to minimize the amount of material required to form outer plates 300 while ensuring that each outer plate 300 is the same, it may be preferable to configure outer plates 300 to each include a number of teeth 310 that divides equally into the total number of teeth 210. For example, in the depicted embodiment, main body has 27 teeth 210, and therefore 9 outer plates 300 are used, each of which includes 3 teeth 310 (27/9=3). Accordingly, the number of outer plates 300 and the number of teeth 310 that each outer plate 300 includes can depend on the number of teeth 210 that main body 200 includes.

In addition to including notch 311 that creates exposed region 200a around notch 211, each outer plate 300 may also include a number of openings 313 spaced along the outer plate. Openings 313 can expose a portion of main body 200 and can function to facilitate the attachment of outer plate 300 to main body 200 (e.g., via welding).

FIGS. 5A-5F each provide a view of a cutter 400 that is configured in accordance with embodiments of the present invention. As best seen in the exploded view in FIG. 5B, cutter 400 includes a cutter main body 410, a plate 420 and one or more cutting elements 430. Cutter main body 410, which may be formed of a steel alloy, has a general L-shape formed by a rear portion 411 and a front portion 412. Rear portion 411 includes an inner surface 411b (which references that the surface faces axially inward), an outer surface 411c (which references that the surface faces axially outward) and a rear surface 411d (which references that the surface faces towards trailing edge 210b/310b). Front portion 412 includes a front surface 412a, an inner surface 412b, an outer surface 412c and a rear surface 412d.

Plate 420 is configured to be coupled to front surface 412a to thereby secure plate 420 to cutter main body 410. Plate 420, which may be formed of tungsten or another hard metal, primarily functions to shield cutter main body 410, including to prevent the width of cutter main body 410 from being worn away. A notch 421 is formed in the outer edge of plate 420 and is shaped and sized to receive cutting element(s) 430. For example, in the depicted embodiment, notch 421 has a generally rectangular shape but has rounded corners to match the circular shape of the two cutting elements 430 that are positioned therein. Accordingly, with cutting elements 430 positioned side-by-side, the rounded edges of cutting elements 430 will be positioned against the rounded corners of notch 421. The walls of notch 421 can therefore reinforce and retain cutting elements 430 as asphalt saw blade 100 is used. It is noted, however, that cutting elements 430 of different shapes and/or sizes and/or a different number of cutting elements 430 could be used in embodiments of the present invention. In such cases, the shape and/or size of notch 421 could be adapted to ensure that notch 421 will receive and reinforce the cutting element(s).

Figure 5C:
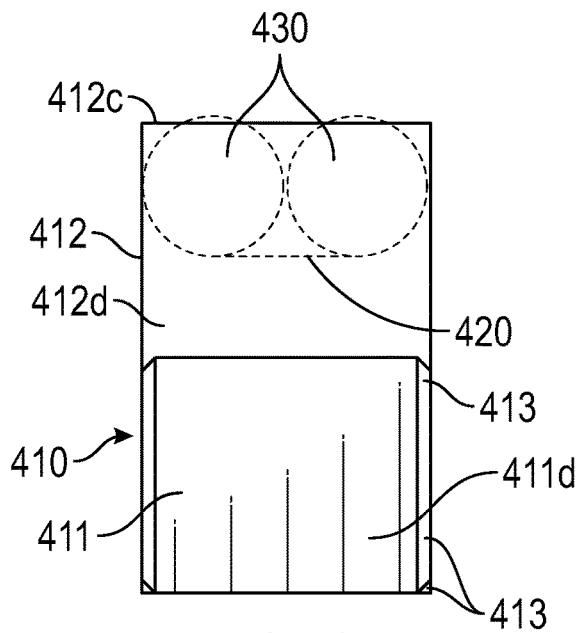
FIG. 5C provides a rear view of the cutter of FIG. 5A.
Figure 5D:
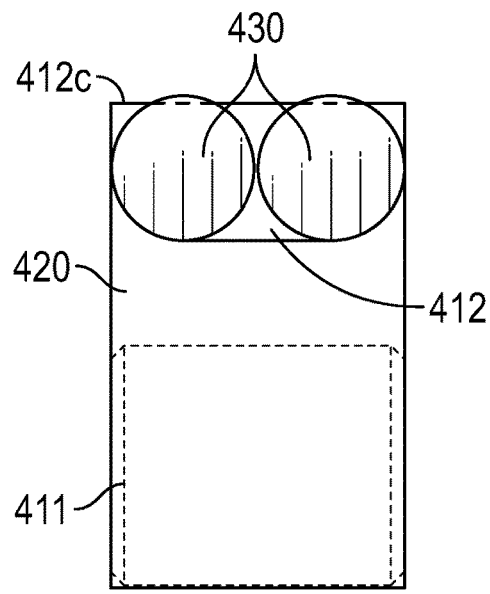
FIG. 5D provides a front view of the cutter of FIG. 5A.
Figure 5E:
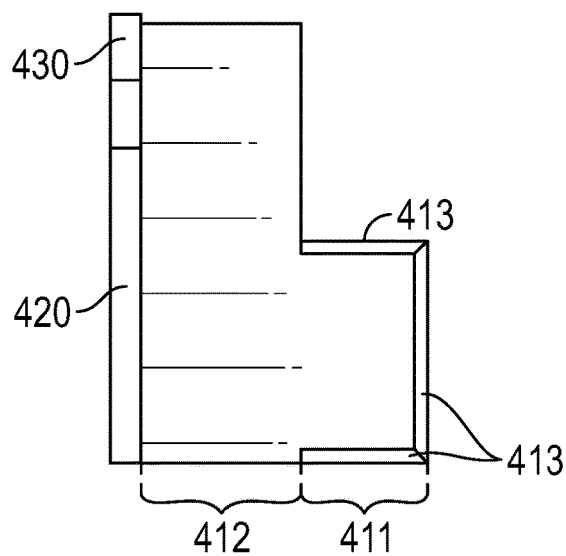
FIG. 5E provides a side view of the cutter of FIG. 5A.
Figure 5F:
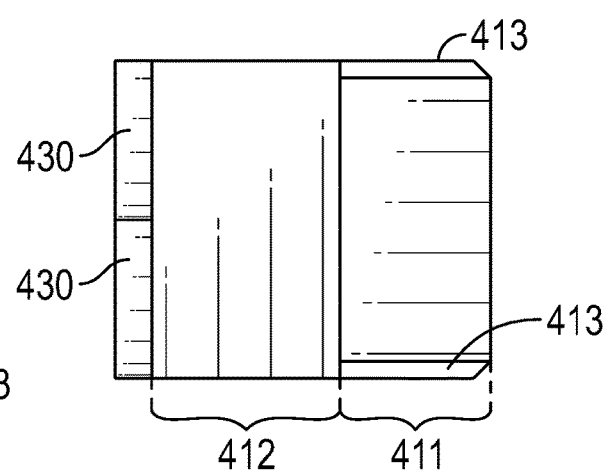
FIG. 5F provides a top view of the cutter of FIG. 5A.

Plate 420 may have a width that generally matches the width of front portion 412 of cutter main body 410 and a height that is less than the height of front portion 412 of cutter main body 410. As best seen in FIGS. 5C and 5D, the height of plate 420 and/or the positioning of notch 421 can cause cutting elements 430 to extend outwardly beyond outer surface 412c of front portion 412. Accordingly, in some embodiments including the depicted embodiment, plate 420 substantially covers front surface 412a except for the portions of front surface 412a over which cutting elements 430 are positioned. In some embodiments, the combined width of cutting elements 430 can substantially match the width of front surface 412a as shown in FIG. 5D. Both plate 420 and cutting element(s) 430 can be coupled to front surface 412a in any suitable manner (e.g., via welding).

Cutting elements 430, which may be formed of polycrystalline diamond (PCD), function to cut through asphalt. By employing two circular shaped cutting elements 430, the combined length of the cutting edge is maximized. However, embodiments of the present invention should not be limited to any particular number or shape of cutting elements 430.

Figure 6:
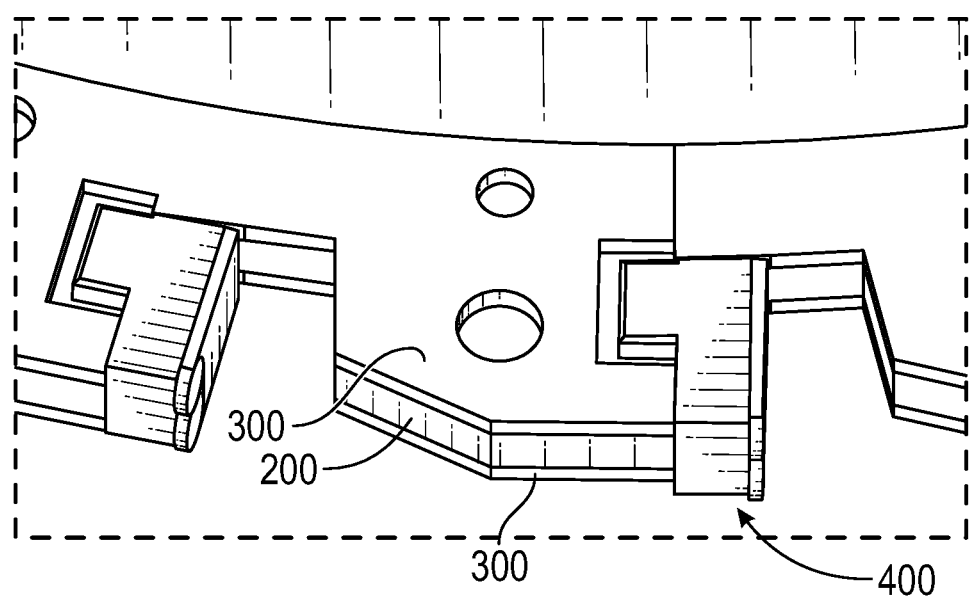
FIG. 6 provides a detailed view of a portion of FIG. 1B showing how a cutter is positioned relative to the teeth of the main body and outer plates.

As is best shown in FIG. 6, which is a detailed view of a portion of FIG. 1A, with rear surface 412d of front portion 412 positioned against leading edge 210a/310a and inner surface 412b positioned against radial edge 205a/305a, rear portion 411 of cutter main body 410 will insert into and be positioned within notches 211 and 311. Accordingly, exposed portion 200a on both sides of main body 200 will surround rear portion 411. With rear portion 411 in this position, cutter 400 can be secured directly to main body 200. In particular, by configuring outer plates 300 to create exposed portion 200a, outer plates 300 can reinforce main body 200, and particularly teeth 210, while retaining the ability to weld cutter 400 directly to main body 200. Rear portion 411 may also have beveled edges 413 to enhance the weld penetration (i.e., to allow the weld to wrap around the sides of rear portion 411.

Notches 211 and 311 also provide greater surface area for the connection between cutter 400 and main body 200/outer plates 300. In other words, once welded or otherwise coupled, rear portion 411 will be locked within notches 211 and 311 thereby making it much less likely that cutter 400 will break away from asphalt saw blade 100.

In summary, an asphalt saw blade configured in accordance with embodiments of the present invention may provide a notched interface for coupling the cutters to the main body of the asphalt saw blade and may reinforce this notched interface with outer plates. The cutter itself can be configured with cutting elements and a plate that reinforces the cutting elements and protects the cutter's main body from wear. Such configurations can greatly enhance the life of an asphalt saw blade.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A saw blade comprising:
   a main body having a plurality of teeth;
   outer plates that are coupled to opposing sides of the main body, the outer plates having teeth that align with the teeth of the main body; and
   cutters that are coupled to the teeth of the main body and to the teeth of the outer plates via a notched interface, each cutter comprising a cutter main body having a front portion and a rear portion, the notched interface comprising a notch formed in each tooth of the main body and the rear portion of the cutter main body that is positioned within the notch, each cutter including a plate that is coupled to a front surface of the front portion of the cutter main body, each cutter including one or more cutting elements that are coupled to the front surface of the front portion of the cutter main body adjacent to the plate, the one or more cutting elements extending beyond an outer surface of the cutter main body.

2. The saw blade of claim 1, wherein the notched interface also comprises a notch formed in each tooth of the outer plates.

3. The saw blade of claim 2, wherein the notch formed in each tooth of the outer plates is configured to create an exposed area of the main body around the notch formed in the corresponding tooth of the main body.

4. The saw blade of claim 3, wherein the exposed area has a C shape.

5. The saw blade of claim 1, wherein the plate includes a notch within which the one or more cutting elements are positioned.

6. The saw blade of claim 1, wherein the rear portion of the cutter main body includes beveled edges.

7. A saw blade comprising:
   a main body having a plurality of teeth; and
   a plurality of cutters, each cutter being coupled to a particular tooth of the plurality of teeth on the main body;
   wherein each cutter comprises a cutter main body, a plate secured to a front surface of the cutter main body and one or more cutting elements secured to the front surface of the cutter main body adjacent to the plate, the one or more cutting elements extending beyond an outer surface of the cutter main body.

8. The saw blade of claim 7, further comprising:
   outer plates that are coupled to opposing sides of the main body, the outer plates having teeth that align with the teeth of the main body.

9. The saw blade of claim 8, wherein the main body and the outer plates include notches for receiving a rear portion of the cutter main body.

10. The saw blade of claim 9, wherein the notches of the outer plates are configured to create an exposed area of the main body that extends around the notches of the main body.

11. The saw blade of claim 7, wherein the one or more cutting elements comprise two cutting elements.

12. The saw blade of claim 11, wherein the plate includes a notch within which the two cutting elements are positioned.

13. The saw blade of claim 7, wherein each cutter is welded to the particular tooth of the plurality of teeth on the main body.

14. The saw blade of claim 13, wherein the plurality of teeth on the main body have beveled edges.

15. The saw blade of claim 13, wherein the main body is formed of steel.

16. The saw blade of claim 13, wherein the cutter main body is formed of steel.

17. A saw blade comprising:
- a main body having an inner body and a plurality of teeth that extend from a radial edge of the inner body;
- outer plates having an inner body and a plurality of teeth that extend from a radial edge of the inner body of the outer plates, the outer plates being coupled to opposing sides of the main body, the teeth of the outer plates aligning with the teeth of the main body, wherein each of the teeth of the main body has a notch, and each of the teeth of the outer plates has a notch that creates an exposed area of the main body around the notch of the corresponding tooth of the main body; and
- cutters that are coupled to the teeth of the main body via the respective notches.

18. The saw blade of claim 17, wherein each cutter has a cutter main body having a front portion and a rear portion, and wherein each cutter is coupled to a particular tooth of the main body by positioning the rear portion of the cutter main body within the notch of the particular tooth.

19. The saw blade of claim 17, wherein each cutter includes a cutter main body having a front surface, a plate secured to the front surface and one or more cutting elements secured to the front surface.

20. The saw blade of claim 17, wherein the cutters are also coupled to the teeth of the outer plates.

\* \* \* \* \*